United States Patent
Pfau et al.

(10) Patent No.: US 9,046,397 B2
(45) Date of Patent: Jun. 2, 2015

(54) METHOD FOR REGISTERING FLOW AND A THERMAL, FLOW MEASURING DEVICE

(75) Inventors: Axel Pfau, Aesch (CH); Vivek Kumar, Allschwil (CH); Anastasios Badarlis, Birsfelden (CH)

(73) Assignee: Enrdress + Hauser Flowtec AG, Reinach (CH)

( * ) Notice: Subject to any disclaimer, the term of this patent is extended or adjusted under 35 U.S.C. 154(b) by 492 days.

(21) Appl. No.: 13/503,380

(22) PCT Filed: Aug. 17, 2010

(86) PCT No.: PCT/EP2010/061948
§ 371 (c)(1),
(2), (4) Date: Apr. 23, 2012

(87) PCT Pub. No.: WO2011/047898
PCT Pub. Date: Apr. 28, 2011

(65) Prior Publication Data
US 2012/0209543 A1    Aug. 16, 2012

(30) Foreign Application Priority Data

Oct. 23, 2009   (DE) .......................... 10 2009 045 956

(51) Int. Cl.
*G01F 1/00*        (2006.01)
*G01F 1/684*       (2006.01)
(Continued)

(52) U.S. Cl.
CPC ................ *G01F 1/6842* (2013.01); *G01F 1/69* (2013.01); *G01P 13/04* (2013.01)

(58) Field of Classification Search
CPC .................................. G01F 1/69; G01F 1/6842
USPC ........................................... 702/12, 49, 50, 45
See application file for complete search history.

(56) References Cited

U.S. PATENT DOCUMENTS 4,363,238 A    12/1982  Willam
5,817,932 A    10/1998  Nishimura et al.
(Continued)

FOREIGN PATENT DOCUMENTS

DE    24 28 352       1/1976
DE    2428352 A1      1/1976
(Continued)

OTHER PUBLICATIONS

English translation of the IPR.
(Continued)

*Primary Examiner* — Phuong Huynh
(74) *Attorney, Agent, or Firm* — Bacon & Thomas, PLLC

(57) ABSTRACT

A for operating a thermal, flow measuring device having a first sensor having a first heatable, resistance thermometer and at least one additional, second sensor having a second heatable, resistance thermometer, wherein a decision coefficient is calculated according to the formula $DC=(PC_1-PC_2)/PC_1$, wherein $PC_1(t=t_1)=P_{1,1}(t_1)/(T_{1,heated;actual}(t=t_1)-T_{medium;actual}(t=t_1))$ and $PC_2(t=t_2)=P_{2,2}(t_2)/(T_{2,heated;actual}(t=t_2)-T_{medium;actual}(t=t_2))$, with P being the heating powers absorbed by the corresponding resistance thermometers at the points in time t and the temperature values T, wherein the value of the decision coefficient shows flow direction of a measured medium in the measuring tube.

4 Claims, 3 Drawing Sheets

(51) Int. Cl.
    *G01F 1/69*    (2006.01)
    *G01P 13/04*    (2006.01)
    *G01F 17/00*    (2006.01)

(56) References Cited

U.S. PATENT DOCUMENTS

| | | | |
|---|---|---|---|
| 6,170,327 | B1 | 1/2001 | Wildgen |
| 6,494,090 | B1 * | 12/2002 | Losing et al. ............... 73/204.26 |
| 8,583,385 | B2 * | 11/2013 | Pfau et al. ........................ 702/47 |
| 2001/0039833 | A1 | 11/2001 | Engel |
| 2004/0025584 | A1 | 2/2004 | Akamatsu |
| 2004/0031331 | A1 | 2/2004 | Blakley et al. |
| 2008/0289411 | A1 | 11/2008 | Schrag |

FOREIGN PATENT DOCUMENTS

| | | |
|---|---|---|
| DE | 3637537 A1 | 5/1988 |
| DE | 19618520 C1 | 9/1997 |
| DE | 19819855 A1 | 11/1999 |
| DE | 20103966 U1 | 7/2001 |
| DE | 20103966 U1 | 8/2001 |
| DE | 102004058553 | 6/2006 |
| DE | 102004058553 A1 | 6/2006 |
| DE | 102007023840 A1 | 11/2008 |
| DE | 102007023840 A1 | 11/2008 |
| EP | 0 0024327 A1 | 3/1981 |
| EP | 0024327 | 3/1981 |
| GB | 1512587 | 6/1978 |
| GB | 2210983 A | 6/1989 |
| WO | 97/49997 A1 | 12/1997 |
| WO | WO 2006/058863 A1 | 6/2006 |

OTHER PUBLICATIONS

German Search Report in corresponding Application No. 10 2009 045 956.1, dated May 17, 2010.
International Search Report in corresponding International Application No. PCT/EP2010/061948, dated Jul. 8, 2011.

* cited by examiner

METHOD FOR REGISTERING FLOW AND A THERMAL, FLOW MEASURING DEVICE

TECHNICAL FIELD

The present invention relates to a method for registering flow and the flow direction of a measured medium in a measuring tube and to a thermal, flow measuring device for performing the method, having a first heatable, resistance thermometer and at least a second heatable, resistance thermometer.

BACKGROUND DISCUSSION

Conventional thermal, flow measuring devices use usually two, as equal as possible, temperature sensors, which are arranged in, most often, pin-shaped, metal shells, so-called stingers, or prongs, and which are in thermal contact with the medium flowing through a measuring tube or through the pipeline. For industrial application, the two temperature sensors usually are installed in a measuring tube; the temperature sensors can, however, also be mounted directly in the pipeline. One of the two temperature sensors is a so-called active temperature sensor, which is heated by means of a heating unit. The heating unit is either an additional resistance heater, or, if the temperature sensor itself is a resistance element, e.g. an RTD (Resistance Temperature Device) sensor, such is heated by conversion of electrical power, e.g. by a corresponding variation of the measuring electrical-current. The second temperature sensor is a so-called passive temperature sensor: It measures the temperature of the medium.

Usually, in a thermal, flow measuring device, the heatable temperature sensor is so heated that a fixed temperature difference is established between the two temperature sensors. Alternatively, it has also been known to provide, via a control unit, a constant heating power.

If there is no flow in the measuring tube, then a constant amount of heat is required as a function of time for maintaining the predetermined temperature difference. If, in contrast, the medium to be measured is moving, the cooling of the heated temperature sensor is essentially dependent on the mass flow of the medium flowing past. Since the medium is colder than the heated temperature sensor, the flowing medium transports heat away from the heated temperature sensor. In order thus in the case of a flowing medium to maintain the fixed temperature difference between the two temperature sensors, an increased heating power is required for the heated temperature sensor. The increased heating power is a measure for the mass flow of the medium through the pipeline.

If, in contrast, a constant heating power is supplied, then the temperature difference between the two temperature sensors lessens as a result of the flow of the medium. The particular temperature difference is then a measure for the mass flow of the medium through the pipeline, or through the measuring tube.

There is, thus, a functional relationship between the heating energy needed for heating the temperature sensor and the mass flow through a pipeline, or through a measuring tube. The dependence of the so-called heat transfer coefficient of the mass flow of the medium through the measuring tube, or through the pipeline is utilized in thermal, flow measuring devices for determining the mass flow. Devices, which operate on this principle, are available from Endress+Hauser under the marks, t-switch', t-trend' or 't-mass'.

Until now, mainly RTD-elements with helically wound platinum wires have been applied in thermal, flow measuring devices. In the case of thin film, resistance thermometers (TFRTDs), conventionally, a meander-shaped platinum layer is vapor deposited on a substrate. Beyond that, another, glass layer is applied for protecting the platinum layer. The cross section of the thin film, resistance thermometer is, in contrast with the round cross section of RTD-elements, rectangular. The heat transfer into the resistance element and/or from the resistance element occurs accordingly via two, oppositely lying surfaces, which together make up a large part of the total surface of a thin film, resistance thermometer.

The patent documents EP 0 024 327 and U.S. Pat. No. 4,083,244 show different embodiments of thermal, flow measuring devices, which can also ascertain flow direction. In this regard, flow conditioning bodies are arranged in the flow before a temperature sensor.

SUMMARY OF THE INVENTION

An object of the invention is to provide a thermal, flow measuring device, with which flow direction of the measured medium is easily ascertainable.

The object is achieved by a method for registering flow and flow direction of a measured medium in a measuring tube having a first heatable, resistance thermometer and at least a second heatable, resistance thermometer, wherein, at least at a first point in time and at an additional, second point in time, especially, however, at points in time $t=t_0, t_1, t_2, t_3, \ldots t_n$, with n being a natural number, the temperature of the measured medium $T_{medium;actual}(t)$ is measured, wherein a first instantaneous heating power $P_{1,1}(t_1)$ is absorbed at a first point in time by the first heatable, resistance thermometer, wherein a second heating power $P_{2,2}(t_2)$ is absorbed at a second point in time by the second heatable, resistance thermometer, wherein the first heatable, resistance thermometer provides a first temperature measured value $T_{1,heated;actual}(t=t_1)$ for the first point in time and a first coefficient $PC_1(t_1)$ representing the flow of the measured medium through the measuring tube is calculated as a function of the heating power $P_{1,1}(t_1)$ absorbed by the first resistance thermometer, the temperature of the measured medium $T_{medium;actual}(t_1)$ and the temperature of the first heatable, resistance thermometer $T_{1,heated;actual}(t_1)$, wherein the second heatable, resistance thermometer provides a second measured value of the temperature $T_{2,heated;actual}(t_2)$ at the second point in time $t_2$ and a second coefficient $PC_2(t_2)$ is calculated as a function of the heating power $P_{2,2}(t_2)$ absorbed by the second resistance thermometer, the temperature of the measured medium $T_{medium;actual}(t_2)$ and the temperature of the second heatable, resistance thermometer $T_{2,heated;actual}(t_2)$, and wherein a decision coefficient is calculated as a function of the first coefficient $PC_1(t_1)$ and the second coefficient $PC_2(t_2)$, wherein the value of the decision coefficient shows flow of the measured medium in the measuring tube in a first flow direction, especially parallel to the measuring tube axis, when the value of the decision coefficient lies above a previously established limit value and wherein the value of the decision coefficient shows flow of the measured medium in the measuring tube in a second flow direction, when the value of the decision coefficient lies below the previously established limit value, wherein the second flow direction is opposite to the first flow direction.

In a first further development of the invention, it is provided that the first coefficient $PC_1(t_1)$ representing the flow of the measured medium through the measuring tube at the first point in time $t_1$ is calculated according to the formula $PC_1(t_1) = P_{1,1}(t_1)/(T_{medium;actual}(t=t_1)-T_{medium;actual}(t=t_1))$, and the second coefficient $PC_2(t_2)$ representing the flow of the measured medium through the measuring tube at the second point in time $t_2$ is calculated according to the formula $PC_2(t_2)=P_{2,2}(t_2)/(T_{2,heated;actual}(t=t_2)-T_{medium;actual}(t=t_2))$, and wherein the decision coefficient is calculated in percent [%] according to the formula $DC=(PC_1-PC_2)/PC_1$.

In an additional further development of the invention, it is provided that the measured value of the temperature of the measured medium $T_{medium;actual}(t_1)$ at the first point in time is provided by the second heatable, resistance thermometer and/or that the measured value of the temperature of the measured medium $T_{medium;actual}(t_2)$ at the second point in time is provided by the first heatable, resistance thermometer. In an additional further development, the measured value of the temperature of the measured medium $T_{medium;actual}(t)$ at the first and second points in time and/or at all points in time t is provided by an additional, third temperature sensor, especially a third resistance thermometer.

Accordingly, the first point in time and the second point in time can be different from one another or equal.

Depending on the embodiment of the thermal, flow measuring device, the limit value of the decision coefficient for deciding whether a flow in the first direction or in the second direction is reigning in the measuring tube is equal to zero or else it lies in a range between 29% and 48%.

The first coefficient $PC_1$ is taken into consideration for flow determination, while the second coefficient $PC_2$ is used only for determining flow direction. In this way, an option is to calibrate only the first sensor. Such usually takes up a controlled heating power. For example, a desired temperature difference is set between the temperature of the heated first sensor and the temperature of the measured medium. On the second sensor, in contrast, for example, a previously set voltage is placed. The second sensor is uncontrolled. According to the formula for the electrical instantaneous power $P(t)=U^2(t)/R(t)$, the heating power depends on the voltage placed on, or falling across, the resistance thermometer and the resistance of the resistance thermometer, which, on its part, is, in turn, a function of its temperature. It is thus possible to set both a certain heating power, as well as also a certain voltage.

A calibrating of the measuring device of the invention is, thus, also only necessary in one flow direction, since the absolute values in the other flow direction are equal. Whether it is a voltage dropping across the resistance thermometer, or a voltage placed on the resistance thermometer, depends on the circuitry.

Furthermore, the object of the invention is achieved by a thermal, flow measuring device for determining and/or monitoring flow of a measured medium through a measuring tube, especially for performing the method as claimed in one of claims 1 to 8, comprising a control/evaluation unit, a first sensor and at least one additional, second sensor, which sensors are arranged, at least partially, in the measuring tube, wherein the first sensor has a first heatable, resistance thermometer, for example, one in a first pin-shaped shell, and wherein the second sensor has a second heatable, resistance thermometer, e.g. one in a second pin-shaped shell, wherein the thermal, flow measuring device has a flow guiding body, which is arranged in the measuring tube in an imaginary line with the second heatable, resistance thermometer essentially parallel to the measuring tube axis, wherein the first heatable, resistance thermometer is arranged in the measuring tube spaced from the second heatable, resistance thermometer, especially the first heatable, resistance thermometer can be flowed against by a flow undisturbed by the flow guiding body, especially the flow guiding body has an extent along a longitudinal axis and an extent along a vertical axis, wherein the flow guiding body is so arranged in the measuring tube that the intersection of the longitudinal axis and the vertical axis lies in the imaginary line between the flow guiding body and second sensor, wherein the control/evaluation unit and the second sensor are so embodied, especially so connected, that the second resistance thermometer at a certain point in time, especially during, at the end of or shortly after a heating period, receives a set heating power and/or that a set voltage falls across, or is placed on, the second resistance thermometer. This is dimensioned independently of the temperature of the measured medium. The heating power is, according to $P=U^2/R$, dependent on the voltage U placed on, or falling across, the resistance thermometer and the resistance of the resistance thermometer R, which, on its part, depends on its current temperature, which, in turn, depends on the temperature of the measured medium and its behavior as a function of time.

If the the flow guiding body is a plate, then, according to an example, the intersection of the longitudinal axis and the vertical axis lies in the center of gravity of the plate and the vertical axis and the longitudinal axis of the plate are perpendicular to the measuring tube axis.

In an additional further development, the thermal, flow measuring device has a third sensor for measuring the temperature of the measured medium. The third sensor comprises e.g. a third resistance thermometer in a third pin-shaped shell, wherein also in the case of the first sensor the first resistance thermometer is arranged in a first pin-shaped shell and wherein also in the case of the second sensor the second resistance thermometer is arranged in a second pin-shaped shell (9) and the first sensor and the second sensor and the third sensor are arranged in the measuring tube parallel to one another and/or parallel to the vertical axis of the flow guiding body, i.e. thus that the first pin-shaped shell of the first sensor and the second pin-shaped shell of the second sensor and the third pin-shaped shell of the third sensor are arranged in the measuring tube parallel to one another and/or parallel to the vertical axis of the flow guiding body, especially the third sensor also is arranged in the measuring tube outside of the flow of the measured medium influenced by the flow guiding body, for example, beside the plate, so that the longitudinal axis of the plate intersects the third and/or the first sensor.

The thermal, flow measuring device of the invention is especially used in industrial process measurements technology, in order to measure, for example, gases and/or liquids. In such case, often specifications for limiting power are made, for example, for explosion protection, and can be met.

BRIEF DESCRIPTION OF THE DRAWINGS

The invention will now be explained in greater detail based on the appended drawing and its figures, in which, in each case, a example of an embodiment is presented. Equal elements are provided in the figures with equal reference characters. The figures of the drawing show as follows.

DETAILED DISCUSSION IN CONJUNCTION WITH THE DRAWINGS

Figure 1:
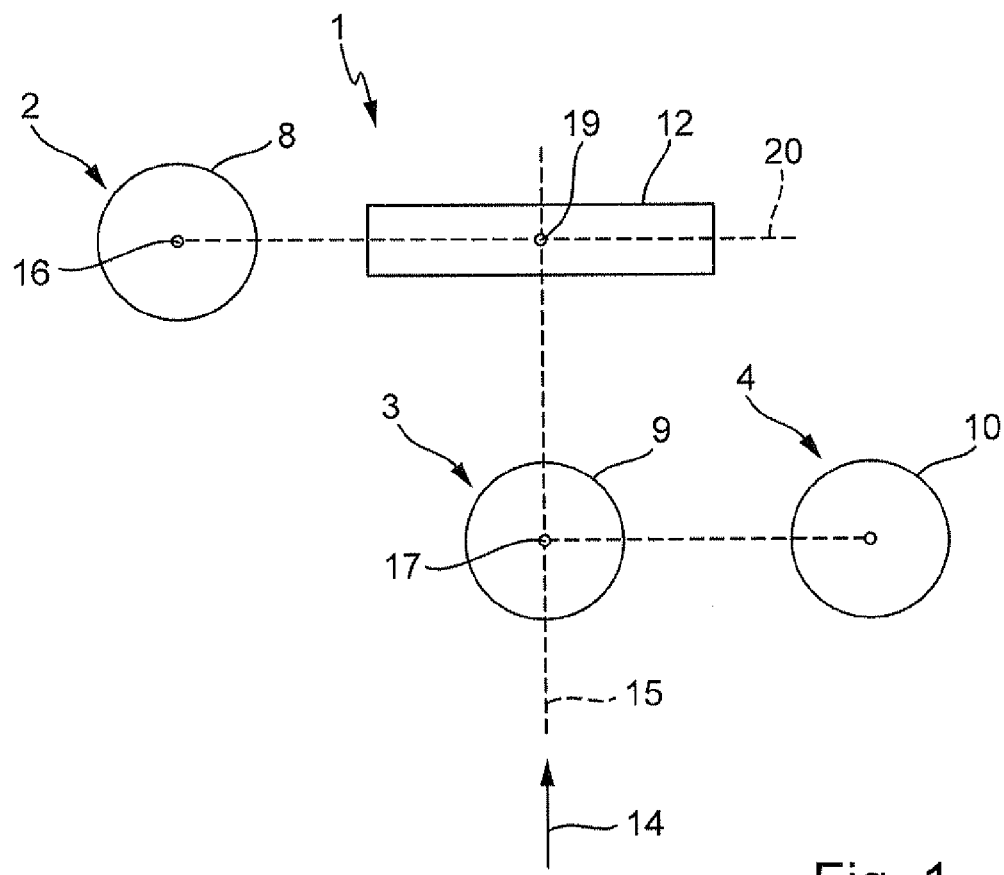
FIG. 1 in section, a first thermal, flow measuring device of the invention.

FIG. 1 shows a first form of embodiment of a thermal, flow measuring device 1 of the invention. A first heatable sensor 2 is placed beside a plate 12 as flow guiding body. The sensor comprises a first resistance thermometer (not shown) in a first shell 8. The central axis 16 of the first shell 8 lies here approximately on the longitudinal axis 20 of the plate 12. The vertical axis 19 of the plate is essentially parallel to the central axes of the three sensors.

The second sensor 3, thus the second shell 9 of the second sensor 3, is arranged in line with the plate 12 in the measuring tube. The vertical axis 19 of the plate 12, as well as the central axis 17 of the second sensor 3 are on the measuring tube axis 15. Thus, the first sensor 2 lies in the measuring tube in a flow of the measured medium uninfluenced by the plate 12. In contrast, the second sensor 3 is placed in the lee of the plate 12, in case in which the measured medium flows in a second direction, opposite to the first flow direction 14 shown in the figure. If the measured medium flows in the direction of the arrow indicating the first flow direction 14, also the second sensor 3 is in undisturbed flow. This leads to the differences in the coefficients between the two flow directions, as is clearly shown.

The second sensor 3 serves here, however, not for measuring the amount of the flow, but, instead, contributes only to the determining of the direction of flow. Therefore, second sensor 3 is also to be considered a sensor that is not controlled. In order simultaneously to calculate the coefficients of the first two sensors 2, 3, a third sensor 4 is provided, which can be embodied as an unheated sensor, since this has the task of providing the current measured value of the temperature of the measured medium for the point in time of the measuring. The third sensor 4, thus, the third shell 10, is likewise arranged in the measuring tube in a flow of the measured medium not conditioned by the plate 12. Here the third sensor 4 lies in a line with the second sensor 3 parallel to the longitudinal axis 20 of the plate 12, and, respectively, perpendicular to the measuring tube axis 15. The distance of the third sensor 4 perpendicular to the measuring tube axis 15 equals the distance of the first sensor 2 to the measuring tube axis 15. Here, in this example the distance perpendicular to the longitudinal axis 20 of the plate 12 is the same as the distance of the second sensor 3. This distance is, however, dependent on the application and is, thus, variable.

In the illustrated example of an embodiment, the shells are of equal construction, i.e. they have, as a rule, the same length, the same wall thickness and especially the same diameter, which amounts e.g. to between 1 and 3 mm, here about 2 mm. The distance of the second and third sensors 3, 4 to the longitudinal axis 20 of the plate 12 is naturally also strongly dependent on the thickness of the plate 12 and amounts here to e.g. one to three times the diameter of the shells. The thickness of the plate lies e.g. in the range between half and twice the diameter of the shells. The separations between the sensors, thus between the first and second sensors 2 and 3 and between the second and third sensors 3 and 4, measured perpendicular to the measuring tube axis are here essentially equal and lie e.g. between two and ten times the diameter of the shells. Also these distances are directly dependent on the plate dimensions, here especially the extent of the plate 12 along the longitudinal axis 20, which can lie here e.g. between two and six times a shell diameter. The extent of the plate 12 along its vertical axis 19 is matched to the size of the resistance thermometers used in the sensors. It can also equal the extent of the plate 12 along its longitudinal axis 20.

The plate 12 can bring about a pressure loss of the measured medium in the measuring tube. Depending on application, its dimensions can thus vary and be correspondingly adapted, or optimized. Above all, the extents of the plate along the longitudinal axis 20 and along the vertical axis 19 are predetermined therefor.

An essential difference relative to the subsequently discussed concepts is that the limit value for flow direction detecting is not zero, but, instead, lies between 29% and 48%.

In this example of an embodiment, the thermal, flow measuring device 1 has, as described, three sensors 2, 3, 4, two heatable sensors 2, 3 and a sensor 4 for determining the temperature of the measured medium. However, a flow measuring device 1 of the invention is also implementable with only two sensors. These undertake then alternately the functions of the heated and the unheated sensor, which measures the temperature of the measured medium.

For all embodiments, the method for operating a thermal, flow measuring device of the invention provides the following method steps.

A first resistance thermometer of a first sensor is heated during a first heating period, it is fed a first amount of heat energy, and the heating power absorbed by the first resistance thermometer is determined at a first point in time. Additionally, a second resistance thermometer of a second sensor is heated during a second heating period with a second amount of heat energy and the heating power absorbed by the second resistance thermometer is determined at a second point in time. Both at the first point in time, as well as also at the second point in time, a measured value of the temperature of the measured medium in the measuring tube is present.

This measured value of temperature of the measured medium can be measured in alternating operation at the first and second points in time by the respectively unheated sensor, or an additional sensor is provided in the measured medium for determining the temperature of the measured medium at the first and second points in time. In the first case, the first point in time is not the same as the second point in time. In the second case, the second point in time can coincide with the first point in time—the heating powers of the first and second sensors are determined simultaneously.

The first heating power at the first point in time is set in relation to the difference between the temperature value of the heated first resistance thermometer at the first point in time and the measured value of the temperature of the measured medium at the first point in time. Analogously, the difference between the temperature of the second heated resistance thermometer at the second point in time and the temperature of the measured medium measured at the second point in time is formed, by which the instantaneous power of the second resistance thermometer at the second point in time is divided. Obtained are, thus, two coefficients at two points in time, which, as above explained, depending on embodiment, can be equal or different from one another.

An essential feature of this method is that only the first sensor is taken into consideration for measuring the amount of flow. The first coefficient is a coefficient reflecting the amount of flow at the first point in time. The first heating power can be limited for reasons of explosion protection, e.g. to 256 mW. Naturally, then also the second heating power is correspondingly capped. The first heating power is controlled. Usually, a desired temperature difference between heated and unheated resistance thermometers is set, e.g. 10° K. It is, however, according to $P=U^2/R$, wherein U is the voltage dropping across the resistance thermometer and R the resistance of the resistance thermometer, also dependent on the resistances of the resistance thermometers, which are, on their part, dependent on the temperature. The second heating power is, in contrast, uncontrolled in reference to a desired temperature difference between the second heated resistance thermometer and the corresponding unheated resistance thermometer of the first or third sensor. For example, it is established by a previously set voltage- or power peak of a certain size.

By means of the two thus calculated coefficients, a decision coefficient is formed. The first coefficient is subtracted from the second coefficient and divided by the second coefficient. Naturally, also the subtraction of the second from the first coefficients is possible, wherein the result is then divided by the first coefficient. Depending on embodiment of the used thermal, flow measuring device of the invention, the limit values shift, as one skilled in the art would know.

Therewith, besides the volume- and/or mass-flow, also flow direction of a measured medium in a measuring tube can be registered.

Figure 2:
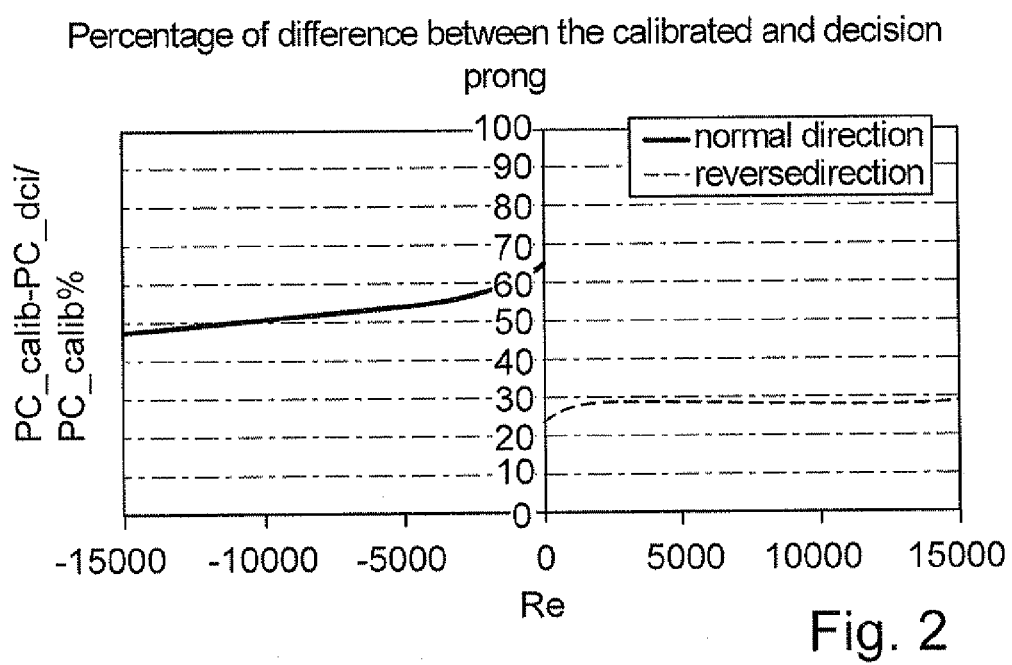
FIG. 2 decision coefficient as a function of Reynolds number for FIG. 1.

FIG. 2 shows the course of the decision coefficient as a function of Reynolds number for the thermal, flow measuring device illustrated in FIG. 1. A distinguishing of the two flow directions is very clear, since the curves of the first and second flow directions are limited to velocity ranges well away from one another. This construction provides reliable decision coefficients, above all, in the case of very slow flow. Also, in this embodiment, the calibrating for flow measurement is only necessary in one flow direction, since the first heatable sensor outputs the same measured values in the two flow directions in the case of otherwise equal flow conditions. The geometry of FIG. 1 causes the decision coefficient to range between 24% and 29% for flows in the first direction and between 48% and 65% for flows in the second direction. Thus, the limit value should be ascertained for high Re-numbers. A determining of the decision coefficient for all flow velocities is not necessary.

Figure 3:
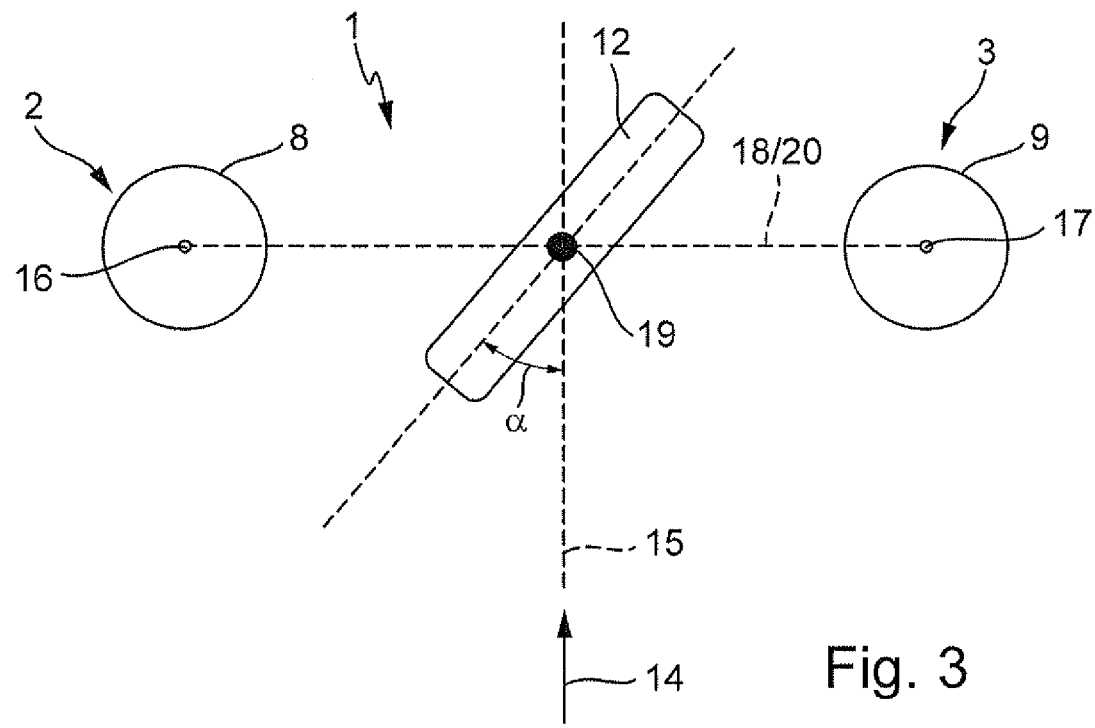
FIG. 3 in section, a further thermal, flow measuring device of the invention.

FIG. 3 shows a thermal, flow measuring device of the invention 1 presented in plan view. Of the first sensor 2 and the second sensor 3 of the thermal, flow measuring device 1, in each case, only the first shell 8 and the second shell 9 are shown. The section extends in a plane perpendicular to the central axes of the shells 16, 17, which, consequently, are only drawn as points. The arrow 14 shows flow direction of the measured medium (not shown) in the measuring tube (not shown). The shown part of the thermal, flow measuring device 1 is, however, located in the mounted state in a measuring tube.

Between the shells 8 and 9 extends an imaginary connecting line 18. It corresponds in this example to the connecting line between the first and second resistance thermometers. It intersects the central axes 16, 17 of the shells 8, 9 approximately perpendicularly. In the center of the connecting line 18, here in a plane, in which plane the measuring tube axis 15 lies, and which plane extends parallel to the central axes 16, 17 of the shells 8, 9, is the intersection of the vertical axis 19 and the longitudinal axis 20 of the flow guiding body, here the plate 12. Since the vertical axis 19 in this representation is cut perpendicularly, and, consequently, appears only as a point, the representation of the vertical axis 19 coincides with the representation of the intersection of the vertical- and the longitudinal axes 19, 20. This is here simultaneously a point of symmetry. The plate 12 is point-symmetric to this intersection. Because of this symmetric construction, the thermal, flow measuring devices 1 of the invention need only be calibrated for flow measurement in one flow direction. The second heatable, resistance thermometer is only required for flow direction detection. The plate 12 has in this example an angle α of about 45° the the measuring tube axis 15 and therewith also to the connecting line 18 between the two shells 8, 9.

The resistance thermometers, which are not shown for reasons of the perspicuity, are arranged essentially in the end sections, or tips, of the shells 8, 9, and the plate 12 lies between the resistance thermometers. A third sensor, which determines here the temperature of the measured medium, is not shown. Such would be arranged in a region of the measuring tube, in which the flow of the measured medium is not, or no longer, influenced by the plate 12.

The concept of this thermal, flow measuring device 1 is based on the local changes of the flow velocity of the measured medium in the measuring tube around the two sensors 2, 3 and the comparison the two coefficients $PC_1$ and $PC_2$, as already described, with the decision coefficient $DC=(PC_2-PC_1)/PC_2$, which shows the flow direction. The plate 12 divides the flow locally, so that the first sensor 2 is arranged in a, here, slowed flow. The plate 12 causes stagnation points of the flow on the plate 12 on the side where the first sensor 2 is located. The second sensor 3, in contrast, is arranged in the accelerated flow. The plate 12 has in this example on both ends of its extent along its longitudinal axis 20, two round ends, which help, the flow to accelerate. The angle α of the plate 12 can, in the case of a changing flow velocity of the measured medium in the measuring tube, be changed and adapted to the flow velocity.

The shells 8, 9 of the first and second sensors 2, 3 have here, in this example, the same diameter. The distance between the two central axes 16, 17 the shells amounts here to about 4.5-times such diameter and the plate 12 has an expansion along its longitudinal axis 20 of about 3-times and along its vertical axis 19 about 5-times such diameter. The thickness of the plate 12, thus its extent perpendicular to the plane defined by the longitudinal- and vertical axes 19, 20, amounts to about 0.5-times the diameter of the shells 8, 9. The already mentioned rounded ends of the plate 12 are correspondingly formed by a radius of size 0.5 mm.

Figure 4:
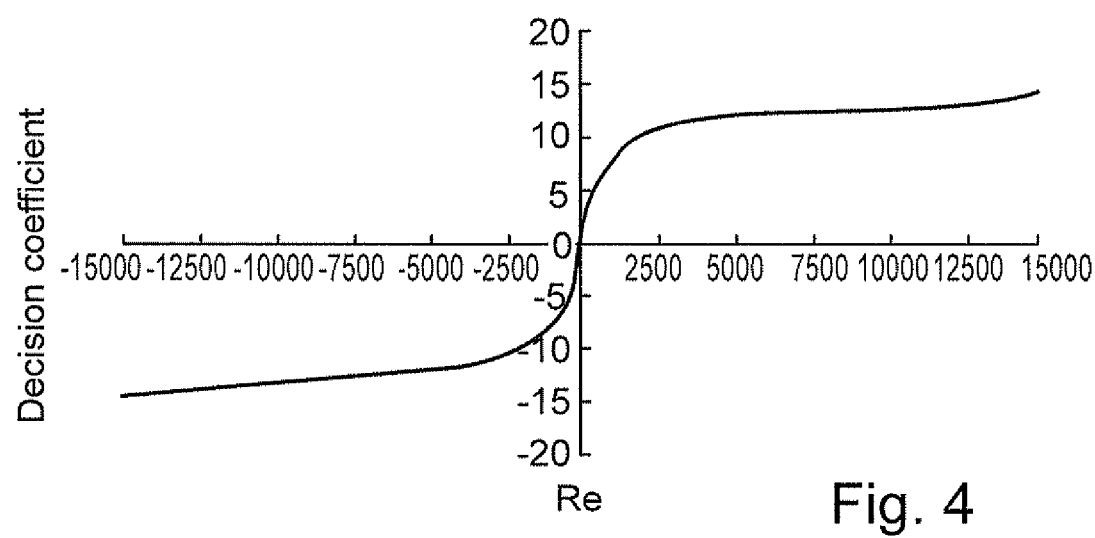
FIG. 4 decision coefficient as a function of Reynolds number for the embodiment of FIG. 3.

FIG. 4 shows the course of the decision coefficient (DC) as a function of Reynolds number (Re), here Re=-15000 . . . 15000. The limit value for the decision, whether a flow is in the first direction shown in FIG. 3 or whether the flow is in the opposite direction, is 0. In the case of slow flows, the values for the opposing flow directions approach one another. In the case of fast flows, the values for deciding flow direction lie, in contrast, widely apart.

Thus, also the second concept has e.g. a plate as flow conditioning component. This is, however, fixedly mountable in the measuring tube—its angle to the measuring tube axis is, at least in the illustrated example, fixed. In both further developments, a heatable sensor sits, because of the construction, at another potential of the flow than the other. An essential difference to the previously sketched concepts is, in the following further development of the invention, the measuring of the stagnant-flow temperature.

Figure 5:
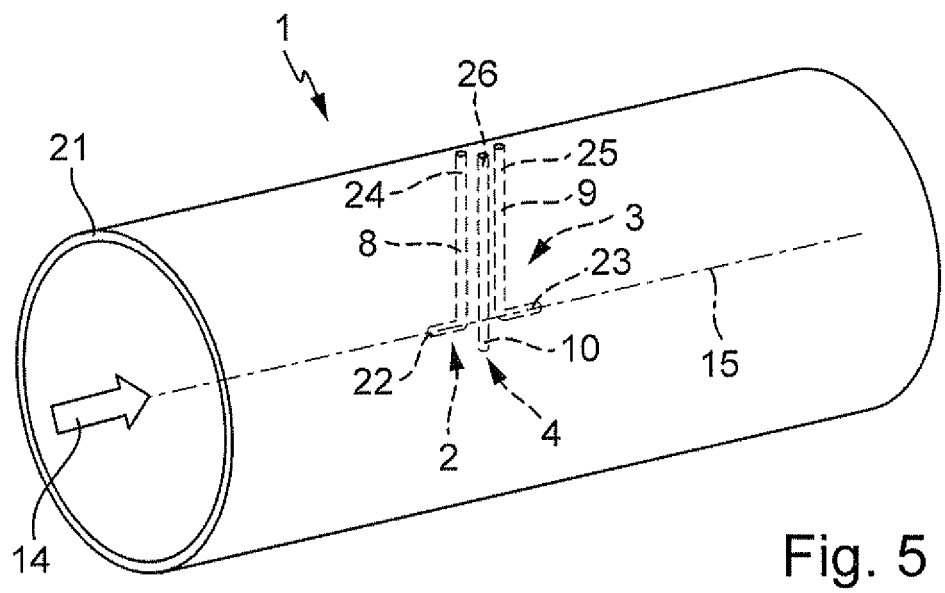
FIG. 5 a further thermal, flow measuring device of the invention.

FIG. 5 shows a thermal, flow measuring device 1 of the invention in three dimensions. It has three sensors 2, 3, 4 in a measuring tube 21, wherein the first sensor 2 has a bent first shell 8 and the second sensor 3 a bent second shell 9. The third sensor 4 has a pin-shaped shell 10, which is arranged in the measuring tube 21 between the first and the second shells 8, 9. The resistance thermometers here (not shown) are secured in the shells 8, 9, 10, most often, with so-called thermal, or heat, bridges or spacers between shell and resistance thermometer. The resistance thermometers of the first and second sensors 2, 3 are, according to the invention, heatably embodied and are mounted in the respective shell end sections. The shell shafts 24, 25, 26 lead out from the measuring tube 21 and are affixable in a sensor holder (not shown). The third sensor 4 measures the temperature of the measured medium.

Located between the here pin-shaped shell shafts 24, 25 and the shell end sections 22, 23 are the bends of the shells 8, 9 of the first and second sensors 2, 3. The bends have, in this example, in each case, a magnitude of about 90°. However, the shells are so arranged in the measuring tube 21 that the first shell end section 22, or its central axis, points in a first direction, here the central axis of the first shell end section 22 extends parallel to the measuring tube axis 15 and points counter to the flow direction 14, and the second shell end section 23 is directed oppositely thereto. If the magnitude of the bend would be not 90° but, instead, for example, only 60°, the shell end section would not be exactly parallel to the measuring tube axis extend and, consequently, would also point not exactly counter to the flow direction, but, instead, only a directional component would point in the first direction. Here, the central axes of the shell end sections 8, 9 coincide approximately with the measuring tube axis.

The basic principle in this embodiment is the difference in the heat flux between stagnation point and wake. The first sensor is directly flowed against, while the second lies in the lee. The heat flux in the stagnation point is higher than in the lee and thereby the coefficient of the first sensor 2 representing the flow is higher than that of the second sensor 3. This arrangement of the sensors is symmetric to the measuring tube, which offers the advantage that the thermal, flow measuring device 1 of the invention only needs to be calibrated in one of the two named directions.

Figure 6:
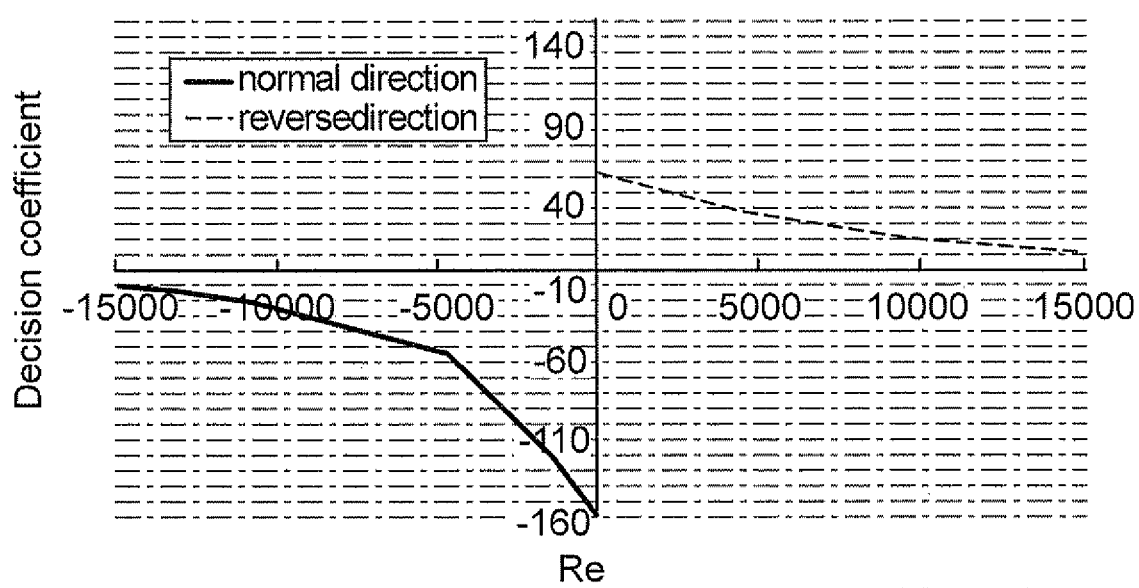
FIG. 6 decision coefficient as a function of Reynolds number for the embodiment of FIG. 5.

The course of the decision coefficient as a function of Reynolds number is shown in FIG. 6. The faster the flow velocity, the nearer is the limit value to zero. In the case of slow flow velocities, the differentiating between flow directions is clearly visible.

The invention claimed is:

1. A thermal, flow measuring device for determining and/or monitoring flow of a measured medium through a measuring tube, comprising: a control/evaluation unit;
    a first sensor; and
    at least a second sensor, which sensors are arranged, at least partially, in the measuring tube, wherein:
    said first sensor has a first heatable, resistance thermometer;
    said second sensor has a second heatable, resistance thermometer;
    the thermal, flow measuring device has a flow guiding body, which is arranged in the measuring tube in a line with said second heatable, resistance thermometer essentially parallel to the measuring tube axis, said first heatable, resistance thermometer is arranged in the measuring tube spaced from said second resistance thermometer;
    said control/evaluation unit and said second sensor are so embodied that said second resistance thermometer receives, at a certain point in time, a set heating power and/or, at a certain point in time, a set voltage falls across said second resistance thermometer;
    the thermal, flow measuring device has a third sensor for determining temperature of the measured medium;
    said first resistance thermometer is arranged in a first pin-shaped shell;
    said second resistance thermometer is arranged in a second pin-shaped shell;
    said third sensor has a third resistance thermometer arranged in a third pin-shaped shell; and
    said first pin-shaped shell, said second pin-shaped shell, and said third pin-shaped shell are arranged in the measuring tube parallel to one another and/or parallel to the vertical axis of said flow guiding body.

2. The thermal, flow measuring device as claimed in claim 1, wherein:
    said flow guiding body is a plate.

3. The thermal, flow measuring device as claimed in claim 1, wherein:
    said third sensor intersects a longitudinal axis of said flow guiding body.

4. The thermal, flow measuring device as claimed in claim 1, wherein:
    said third sensor has a separation from said flow guiding body from one to three times the diameter of said third shell; and/or
    said first sensor has a separation from said flow guiding body measured parallel to the longitudinal axis of said flow guiding body from one to three times the diameter of said first shell.

* * * * *